United States Patent [19] [11] Patent Number: 5,388,047
Ryan et al. [45] Date of Patent: Feb. 7, 1995

[54] AIRCRAFT TRAFFIC ALERT AND COLLISION AVOIDANCE DEVICE

[75] Inventors: Dean E. Ryan, Columbus; Paul A. Ryan, Dublin; William C. Brodegard, Columbus, all of Ohio

[73] Assignee: Ryan International Corp., Columbus, Ohio

[21] Appl. No.: 853,147

[22] Filed: Mar. 18, 1992

Related U.S. Application Data

[63] Continuation-in-part of Ser. No. 815,489, Dec. 31, 1991, Pat. No. 5,157,615, which is a continuation of Ser. No. 462,387, Jan. 9, 1990, Pat. No. 5,077,673.

[51] Int. Cl.$^6$ .............................................. G06F 15/50
[52] U.S. Cl. .................................... 364/461; 364/439; 364/424.06; 364/424.01; 342/32; 342/455; 342/37; 340/961
[58] Field of Search ............... 364/461, 516, 554, 439, 364/443, 460, 424.06, 452; 342/455, 30, 29, 31, 32; 340/961, 967, 968, 974, 975

[56] References Cited

U.S. PATENT DOCUMENTS

| | | | |
|---|---|---|---|
| 3,626,411 | 12/1971 | Litchford | 343/6 R |
| 3,691,559 | 9/1972 | Jackson . | |
| 3,713,161 | 1/1973 | Rice | 343/112 CA |
| 3,875,570 | 4/1975 | Litchford | 343/6.5 LC |
| 4,710,770 | 12/1987 | Gunny | 342/455 |
| 4,782,450 | 11/1988 | Flax | 364/461 |
| 4,789,865 | 12/1988 | Litchford | 342/455 |
| 4,899,156 | 2/1990 | Litchford et al. | 342/37 |
| 4,910,526 | 3/1990 | Donnangelo et al. | 342/32 |
| 4,978,945 | 12/1990 | Funatsu | 340/961 |
| 5,029,092 | 7/1991 | Funatsu | 364/439 |

OTHER PUBLICATIONS

Orlando et al, "TCAS I Design Guidelines", MIT, NTIS Report No. AD/A121 300, Sep. 1982.
"Minimum Operational Performance Standards for Traffic Alert and Collision Avoidance System (TCAS) Airborne Equipment", vol. 1, Consolidated Edition, Radio Technical Commission for Aeronautics, Document No. RTCA/DO-185, Sep. 23, 1983, Consolidated Sep. 6, 1990, pp. 30-35, 84.

Primary Examiner—Kevin J. Teska
Assistant Examiner—Jacques Harold Louis-Jacques
Attorney, Agent, or Firm—Pollock, Vande Sande & Priddy

[57] ABSTRACT

A proximity warning device for aircraft responds solely to transmissions from transponders. The host aircraft has a host transponder and a signal is generated therein and coupled to the device to indicate transmission of a host reply. Selective suppression is implemented based on presence of an SSR beam which is indicated by the signal. Suppression pulses have a fixed duration but randomly selected intervening durations. Data collection proceeds without regard for suppression or the presence of host replies. The shaping of data collection intervals free of interference from suppression provides for improved efficiency for later data decoding and processing. The signal is used to specially mark collected data generated by a host reply. The ability to discriminate between host and other replies allows completely new performance monitoring functions. In one case, the health of the receiver is deduced from the amplitude of host replies. In another case the effectiveness of suppression is noted by capturing host replies in the presence of a suppression pulse.

40 Claims, 8 Drawing Sheets

"W" = 35 μSEC

"X̄" = 525 μSEC

"X" IN THE RANGE OF 189 μSEC TO 861 μSEC

AIRCRAFT TRAFFIC ALERT AND COLLISION AVOIDANCE DEVICE

RELATED APPLICATION

This application is a continuation-in-part of prior co-pending application Ser. No. 07/815,489 filed Dec. 31, 1991, now U.S. Pat. No. 5,157,615 in the names of William Brodegard, Dean Ryan and Paul Ryan, which is a continuation of parent application Ser. No. 07/462,387, filed Jan. 9, 1990, now U.S. Pat. No. 5,077,673. The subject matter of the co-pending application is incorporated herein by this reference.

DESCRIPTION

1. Technical Field

The present invention relates to an aircraft carried device which provides the pilot with information respecting collision threats.

2. Background Art

The co-pending application discloses a system for collision avoidance which can be of significant assistance to the pilot. The system described in the co-pending application has many advantages over the prior art in existence as of the time the parent application was filed.

One of the significant advantages is the fact that the device relies exclusively on the transmissions by aircraft-carried transponders to interrogations by Secondary Surveillance Radar (SSR). Because the device described in the co-pending application does not itself interrogate transponders, the use of the invention does not generate radio frequency transmissions.

One of the many factors which indicated the use of an active system (as opposed to the passive system described in this and the co-pending application) is the masking effect of replies by a host transponder. It is readily apparent that replies generated by the host transponder may mask replies by the transponder of other aircraft located in particularly defined regions of space. In order to limit this "mask" effect, it has been proposed to suppress the host transponder so that, at least during the period of time in which the host transponder was suppressed, there could be no "mask" effect.

Government regulations limit the extent of suppression. Within the confines of the regulatory limit on suppression, there is flexibility in suppression schemes which can be adopted to maximize the detectability of the host aircraft to the air traffic control system and/or maximize the detectability of other aircraft to the host aircraft. One of the contributions of the co-pending application was a particular suppression management scheme in which the initiation of a suppression duration was selected in a certain random fashion.

Experimental evidence has now been accumulated in actually flying with devices such as are described in the co-pending application. That experimental evidence indicated that improvements were desirable to increase the rate at which data on other aircraft was collected without at the same time compromising the detectability of the host aircraft. In part, that improvement is obtained as disclosed herein by altering the suppression regime and/or collecting data (or listening) even in the absence of suppression.

There is prior art in which a proximity warning device "listens" for the transponder replies only when the host transponder is suppressed. Thus whether suppression is periodic or non-periodic, the proximity warning device is in condition to receive data only when the host transponder is suppressed. Because suppression is limited, data reception in such devices is likewise limited. Other prior art suggests "listening" all the time except when the host transponder replies. There are several problems with this approach. The most significant is that under this regime the host will be blind to aircraft in a region of space relative to the host. Because the blind region extends to the host position, this technique eliminates the warning in the region where it is most necessary. In addition, because the time of a host reply is dictated by the SSR, this scheme results in difficult data management problems. For example, this protocol may dictate termination of listening at relatively arbitrary times and prevent reception of a complete reply.

SUMMARY OF THE INVENTION

Contrary to either approach, in accordance with the present invention the proximity warning device is in a condition to receive data ("listen") regardless of either the presence of a host reply or the absence of suppression. However, when the interrogation beam is in the vicinity of the host, the host transponder is subjected to timed suppression. This event is signalled by the presence of one or more host replies. During such condition, suppression is created for the purpose of suppression of the host transponder. However, the data collection or "listening" remains generally independent of suppression. By this arrangement, the time during which data is collected is increased and several other advantages are obtained. By listening even when the host transponder may reply, information is received which reflects on the health of the transponder as well as on the health of the proximity warning device.

Improvements are also made in the efficiency with which processing is implemented. More particularly, as described in the co-pending application, the apparatus performed three different functions in order to identify and locate potential collision threats. These three different functions were:

(1) acquisition of raw data;
(2) reduction of the raw data into intelligible transponder replies; and
(3) processing of transponder replies so as to identify and track other aircraft and, if present, potential collision threats.

As described in the co-pending application, the output of a tuned receiver is selectively recorded in a High Speed RAM. In the event that the existence of data was indicated, the contents of the High Speed RAM was transferred to a data memory. It was only after the data was transferred to the data memory could the functions (2) and (3) be implemented. A number of factors make the decisions of when to collect data and when to transfer data significant.

There is a significant processing cost (in terms of CPU time) in the process of converting receiver samples (as stored in the high speed random access memory HSR) into meaningful data, i.e. the altitude or identity report of a transponder. To the extent meaningful data is being converted, there is a benefit corresponding to the cost. However, raw data from the HSR typically includes partial replies and dead time as well as meaningful data and so there is a significant advantage to be gained by reducing the partial replies and dead time to the extent that reduction is possible. In the device disclosed in the co-pending application, some advantage is achieved by withholding collection of data until receipt of meaningful data is actually detected. This is achieved by the use of the receiver interrupt. The efficiency of data collection can be improved by finer control of the initiation of the data collection process as is described below. Furthermore, in the device described in the co-pending application, once data is detected and the collection process is begun, data is collected until the listening process terminates. That termination occurs as a result of termination of suppression. Since, however, suppression timing was controlled on a basis that was independent of data collection, there was the possibility that termination of data collection would abort the reception of a transponder reply. Any such aborted reply has no value since meaningful data cannot be acquired from less than a complete reply. In accordance with the present invention, the timing of data collection, both as to its inception as well as to its termination, is independent of suppression and therefore the efficiency of the data collection process can be shaped on a rational basis.

In order to maximize the effect of the data being transferred, management of the time between the initiation and termination of data collection is important. Because the typical transponder reply is framed by F1 and F2 pulses, and because the duration between these pulses is typically 21 $\mu$s, it is apparent that initiating data collection only after 21 $\mu$s period of silence will ensure that when data is detected, that data will unambiguously begin with the initial part of a reply, i.e. an F1 pulse. Likewise, ensuring a 21 $\mu$s quiet interval at the termination of data collection also assists in optimizing the data which is actually transferred. Clearly, it is not always possible to terminate data transfer with a 21 $\mu$s quiet interval, but as will be described, that is preferred and is achieved if possible.

Having a connection between the host transponder and the receiver/processor enables the performance of receiver/processor and host transponder response to suppression to be monitored. For example, the signal generated by the host transponder indicating the transmission of a reply, which is coupled to the receiver/processor, can be employed to make a record of the existence of that signal. Because the receiver/processor is tuned to the frequency at which the host transponder transmits replies, the amplitude of the reply detected by the receiver portion of the receiver/processor can also be detected. If the receiver/processor is operating properly, the receiver/processor should indicate a relatively high amplitude for replies generated by the host. This is one factor which can be checked and an indication given to the pilot that the receiver/processor is not operating up to standard in the event that host replies, as indicated in the receiver/processor, have an amplitude which is less than a threshold value which is to be expected by a receiver/processor which is operating correctly.

Another aspect of receiver/processor operation that can also be checked is suppression. During selected times, the receiver/processor will put out a suppression pulse coupled to the host transponder which is designed to prevent the host transponder from transmitting a reply. As has already been mentioned, the host transponder generates a signal which is coupled directly to the receiver/processor indicating the transmission of a reply by the host transponder. If that signal is generated simultaneous with the assertion of a suppression pulse, then an indication has been received that suppression is not effective. This condition can be reported to the pilot. Such information is valuable to the pilot to indicate that his collision avoidance function may not be operating with the accuracy that he may have come to rely on.

BRIEF DESCRIPTION OF THE DRAWINGS

The invention will be described in the following portions of the specification so as to enable those skilled in the art to practice the invention when the specification is taken in conjunction with the attached drawings, in which like reference characters identify identical apparatus and in which.

DETAILED DESCRIPTION OF PREFERRED EMBODIMENTS

Figure 1:
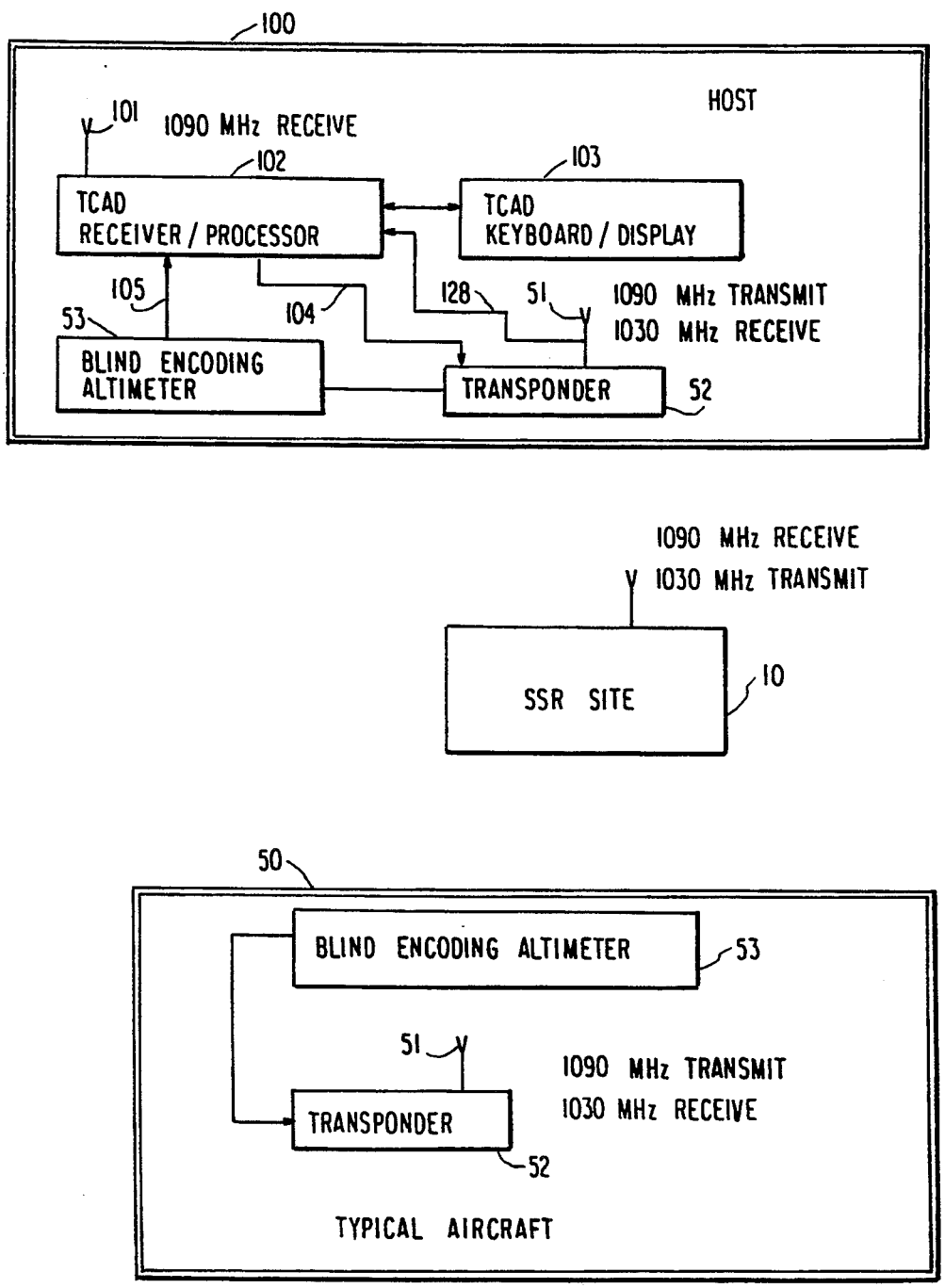
FIG. 1 is a schematic showing of a typical application of the invention and the cooperation of the various components, including a SSR site 10, a host 100 equipped with the apparatus of the invention and the pertinent components of a typical aircraft 50.

FIG. 1 illustrates in schematic fashion the configuration of a typical aircraft 50, and a host aircraft 100, along with the pertinent parameters of a typical Secondary Surveillance Radar site 10. FIG. 1 is identical to FIG. 4 in the co-pending application with the exception that as shown in FIG. 1, the host 100 includes a signal path 128 between the transponder 52 and the TCAD receiver/processor 102. Before describing the improvements of this invention over that described in the co-pending application, the manner in which the data which has been received and decoded is processed to provide for threat determination will be briefly described.

The receiver REC is tuned to the transmit frequency of the transponders. Transmission by any transponder includes a pair of framing pulses separated by approximately 20.3 $\mu$s. Digitally encoded data within the framing pulses represents either the identity of the transmitting aircraft or its pressure altitude. Data, representing the sampled, digitized output of the receiver REC is selectively written to a high speed memory. At appropriate times, as will be described below, the contents of the high speed memory are transferred to the CPU memory. The CPU then decodes the replies and adds to the decoded replies time stamping and amplitude information. Based on this information, the CPU can associate separate replies from a single aircraft and further segregate the aircraft's identity altitude. With this information, a threat prioritization is accomplished. The prioritization depends on two parameters, relative altitude and apparent distance. By tracking an aircraft, rates of change of these parameters can also be estimated so that, for example, in addition to determining relative altitude, the CPU can also determine whether the altitude difference is increasing or decreasing. Likewise, in addition to determining apparent separation, the CPU can also determine whether or not this apparent separation is increasing or decreasing. After prioritizing the threats, the threats can also be compared to appropriate, programmed altitude and separation thresholds. The pilot is alerted in the event program thresholds are violated and whether or not the program thresholds are violated, the pilot has access to displays representing appropriate parameters for those threats of the highest priorities.

One of the significant differences between the device described herein and that described in the co-pending application is the already-mentioned signal path 128 between the transponder 52 and the TCAD receiver/processor 102. The purpose for the signal path 128 is, as will be described below, to signal to the receiver/processor 102 that the transponder 52 is in the process of transmitting.

Figure 2:
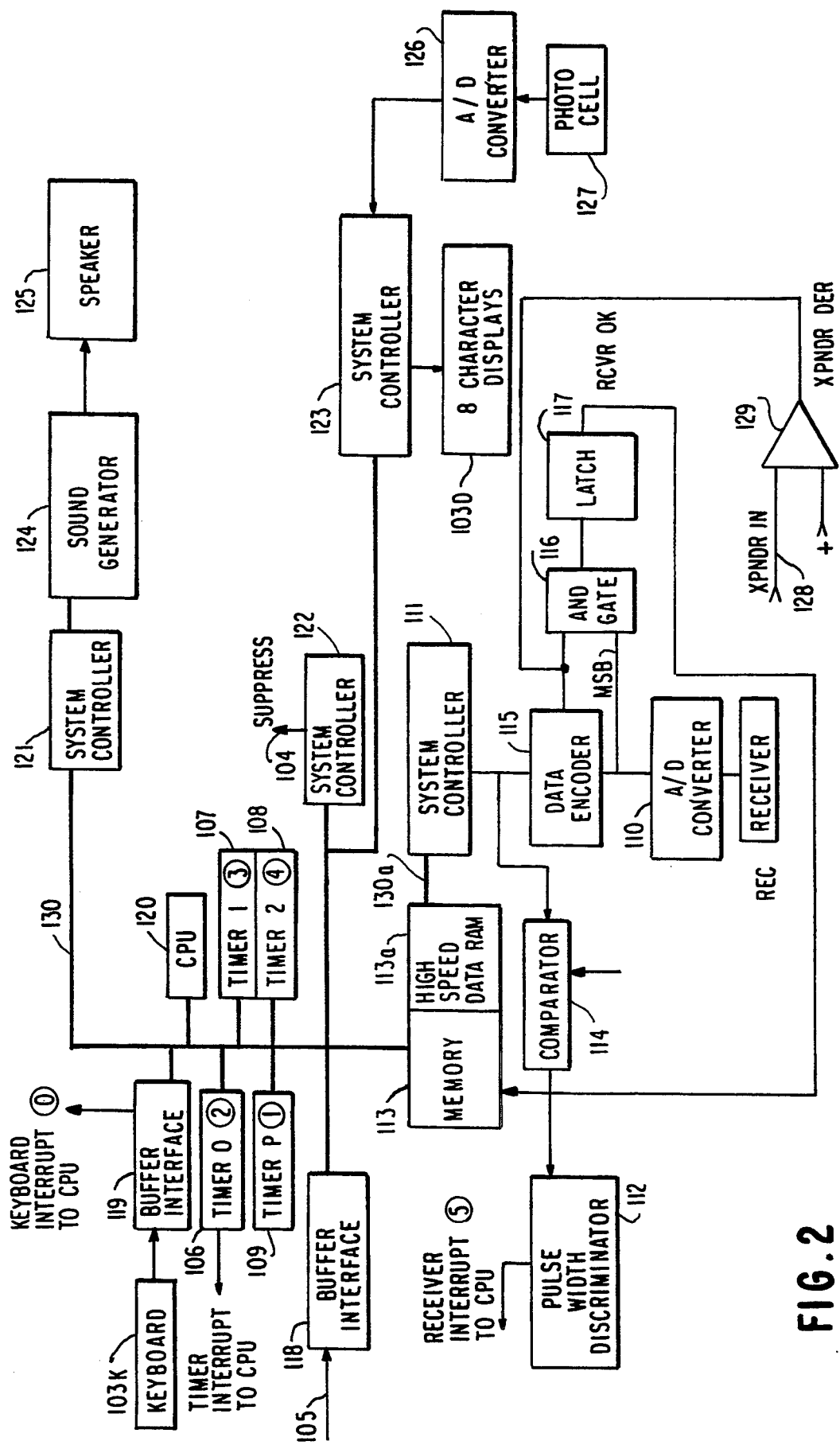
FIG. 2 is a block diagram of the electronics of the present invention incorporating the receiver REC as one component.
Figure 3:
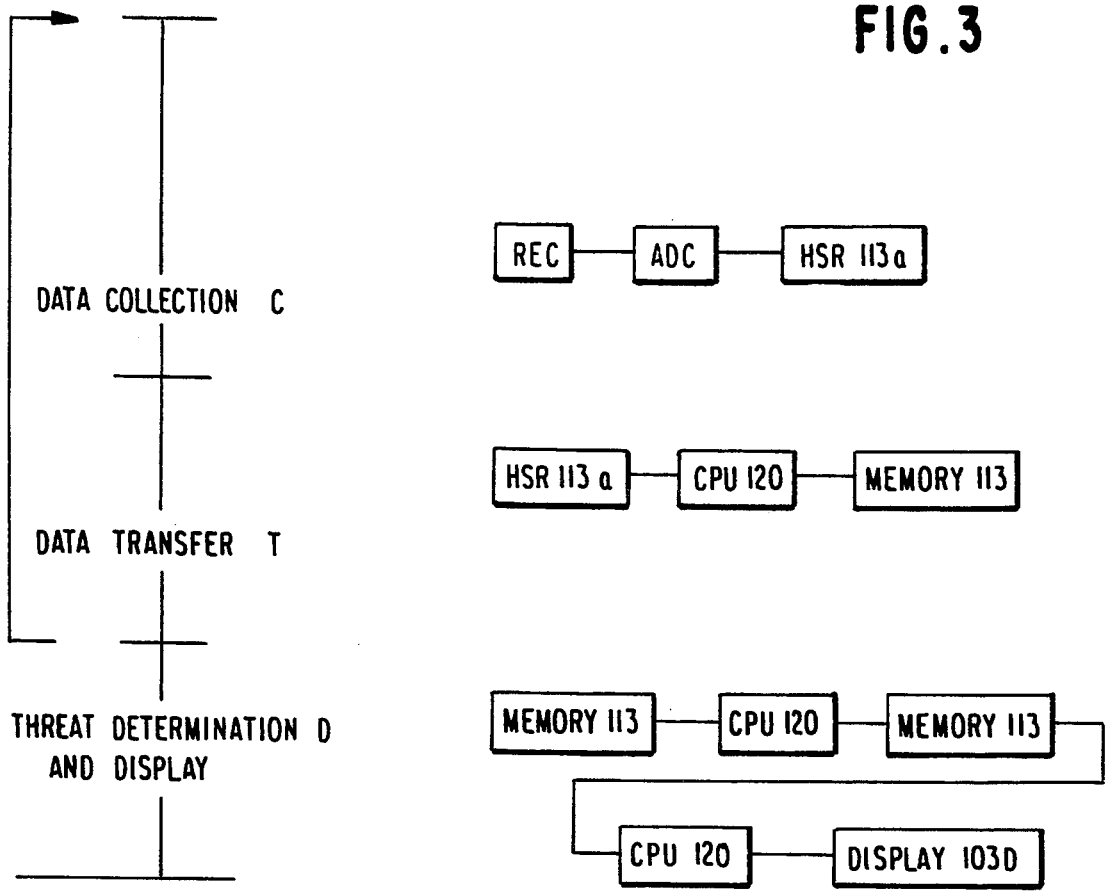
FIG. 3 illustrates in a schematic fashion the three phases of operation of the device and the major components included in each of these phases of operation.

As shown in FIG. 2, the TCAD receiver/processor 102 comprises the receiver component REC and the processor component. The receiver component REC is illustrated in detail in FIG. 5 of the co-pending application. Before describing the operation of the processor of FIG. 2, reference is made to FIG. 3. FIG. 3 illustrates the three phases of operation of the apparatus shown in FIG. 2. Those phases are (as seen at the left in FIG. 3) a data collection phase C, a data transfer phase T and a threat determination and display phase D. The data collection and data transfer phases are exclusive, i.e. during data collection C there is no data transfer and during data transfer T there is no data collection. However, once data transfer is complete, data collection can proceed simultaneously with a threat determination and display phase. To the right of each of the phases, FIG. 3 shows the major components employed in that particular phase. Thus, as shown in FIG. 3, the data collection phase employs the receiver REC, the analog-to-digital converter 110 and the high speed random access memory (HSR) 113a. Similarly, the data transfer phase employs the high speed random access memory 113a, the CPU 120 and the memory 113. From the fact that the high speed random access memory 113a is a data sink in the data collection phase and a source of data in the data transfer phase, it is apparent why the data collection and data transfer phases are mutually exclusive. In the data collection phase, the output of the REC is, after being digitized, selectively stored in the high speed random access memory 113a. The size of HSR 113a is dictated by its function, storing digitized data. In a preferred embodiment, data is digitized at a 100 ns rate. For the times involved here, a 32 Kbyte memory should suffice. At the appropriate time, the data which is thus stored is transferred via the CPU 120 from the high speed random access memory 113a to the memory 113. Once that transfer has been effected, the CPU 120 can process the data to detect the presence of one or more replies, extract the information contained in the replies (aircraft identification and/or altitude), use that information to update information on aircraft being tracked, and then display appropriate information for the operator of the host aircraft. The processes of detection of replies from the data stored in memory 113, extracting information from such detected replies, updating information on aircraft being tracked and displaying information is described in the co-pending application.

As has been noted, a major departure between this invention and that of the co-pending application can be described as follows. As described in the co-pending application, the receiver/processor is in a listen or data collection phase only when the associated transponder is being suppressed. If the transponder is not being suppressed, then the receiver/processor is not conditioned for data collection or listening. On the other hand, as will be described below, in the present invention the listening function (or data collection) is for the most part independent of the presence of transponder suppression. Furthermore, as described below, transponder suppression is initiated when the SSR interrogation beam has been detected. Detection of the SSR beam is implemented in a simple fashion by deriving a signal from the host transponder 52 indicating the generation and transmission of a reply. That signal is used to indicate the presence of the SSR interrogation beam. Once the SSR interrogation beam is detected, the suppression function is enabled. Suppression itself is implemented at certain times during enablement of the suppression function. As will be described, the present invention initiates a suppression pulse at a random time (within specified limits). The suppression function remains enabled until a predetermined time has passed in the absence of detection of a host reply. In order to optimize data collection and to minimize the time expended for data transfer, the timing of data collection is carefully controlled. An attempt is made to identify a quiet time (time in the absence of significant output from REC). Generally, the goal is not to record the output of REC until at least 21 $\mu$s of quiet time has been measured. A transponder reply includes an initial pulse F1, followed by data pulses, and terminated by the F2 pulse, where the delay between F1 and F2 is about 21 $\mu$s. Assuring that 21 $\mu$s of quiet time has elapsed before initiating data collection, ensures that any signal recorded will begin with an F1 pulse. Likewise, when recording is terminated with a 21 $\mu$s quiet time, then the last signal that has been collected must be an F2 pulse. However, it is also important to collect a significant quantum of data before terminating data collection and initiating a data transfer phase. Therefore, the goal requires that we do not terminate the data collection phase until we have detected significant data (after an initial 21 $\mu$s quiet time) and have allowed at least a first fixed interval to expire (which terminates with another 21 $\mu$s quiet time duration). Of course, there is no guarantee that the last 21 $\mu$s of this first fixed interval will be quiet time. Therefore, once the first fixed interval has elapsed (during which significant data has been recorded), then we look for a 21 $\mu$s window of quiet time with which to terminate the data collection phase. If we fail to see a 21 $\mu$s quiet time, and the data collection phase extends out to a longer fixed interval, then we terminate the data collection phase, notwithstanding the inability to see 21 $\mu$s of quiet time. In a preferred embodiment of the invention, the first fixed interval is 100 μs, and longer fixed interval is 300 μs.

FIG. 2, illustrating the receiver/processor 102, differs from the receiver/processor of the co-pending application by the presence of the timers 107-109, the data encoder 115, AND gate 116, latch 117, and comparator 129 and their respective inputs and outputs.

As described in the co-pending application, the CPU 120 was subjected to three different types of interrupts, including a keyboard interrupt (from the buffer interface 119), a timer interrupt (from the timer 106) and a receiver interrupt (from the pulse width discriminator 112). In accordance with the present invention, timers 107, 108 provide interrupts to the CPU 120. The circumstances under which these interrupts are created and the responses of the CPU 120 to those interrupts will be described below.

Another important distinction of this invention over that described in the co-pending application is the use of the signal carried on the path 128 from the transponder 52 which indicates the presence of a reply from the host transponder. The several uses of the signal will now be described, in connection with FIG. 2.

The output of the receiver REC is coupled to the A/D converter 110 just as is described in the co-pending application. However, the data encoder 115 is used to couple the output of the A/D converter 110 to the system controller 111 (on its way to being stored in the HIGH SPEED RAM 113a). The data encoder 115 is also subjected to an input XPNDR DET which is created from XPNDR IN carried on path 128.

While the connection between the A/D converter 110 and the data encoder 115 is shown in FIG. 2 as a single line, in fact the A/D converter 110 converts its analog input signal into a digital value which includes a plurality of bits. There is a separate conductor connecting the output of the A/D converter 110 and the input of the data encoder 115 for each one of these bits. While the number of bits used can vary, in a preferred embodiment of the invention, the A/D converter 110 provides an 8-bit output such that there are eight separate data conductors between the A/D converter 110 and the data encoder 115. Thus, the output value from the A/D converter 110 lies in the inclusive range 0-255. The output of the data encoder 115 is identical to data input in the range 0-254. In the event that the input to the data encoder 115 is the digital value 255, that value is changed to 254. The output of the data encoder 115 carries a digital value of 255 only when the signal XPNDR DET from comparator 129 is present, indicating the generation of a reply by the host transponder 52.

Under appropriate circumstances the output of the data encoder 115 is recorded in the HIGH SPEED RAM 113a, and that data may be transferred to the memory 113 for analysis by the CPU 120. By reserving the data value 255 for replies by the host transponder, the CPU 120, in analyzing the data from the memory 113, can discriminate between data generated by a host reply and data which is not generated by a host reply.

The several interrupts to the CPU 120 are prioritized and identified as follows. The highest priority CPU interrupt is that generated by the pulse width discriminator 112 indicating data reception. The circumstances under which that interrupt is generated are described in the co-pending application. The presence of the interrupt during any listen period represents the receipt of significant data. The next highest priority interrupt is that generated by the timer 1 107 which, as is described below, is employed in connection with the timing of the listen cycle. The next highest priority interrupt is that generated by the timer 2 108 which, as will be described, is used for suppression timing. Interrupts from the timer 0 106 are not employed in accordance with the preferred embodiment. Of lower priority than interrupts from timer 2 108 are interrupts from timer P. Timer P periodically provides interrupts which are used to change the contents of a timer counter. In this way, the contents of the time counter are a measure of time. The CPU 120 can monitor time elapsed from several different events by noting the state of the time counter at the occurrence of the event and thereafter referring to the timer counter; elapsed time from any event is merely the difference between the state of the time counter noted at the event and the present state of the time counter. Finally, interrupts from the keyboard are the lowest priority interrupts.

The latch 117 is used for two distinct purposes. The latch can be set in the event an host transponder reply is indicated by a signal on line 128 but only if the MSB output of the A/D converter 110 is also asserted. As has already been described at appropriate times the contents of the HSR 113a is transferred to the memory 113. At the same time the state of the latch 117 is also written to the same memory, this bit of data is referred to as the latch 117 Image (or latch 117I). This allows the CPU 120, on detection of the data word 255 (indicating a host reply) to determine whether the latch 117 was set. This is one form of performance monitoring which is employed.

Figure 5:
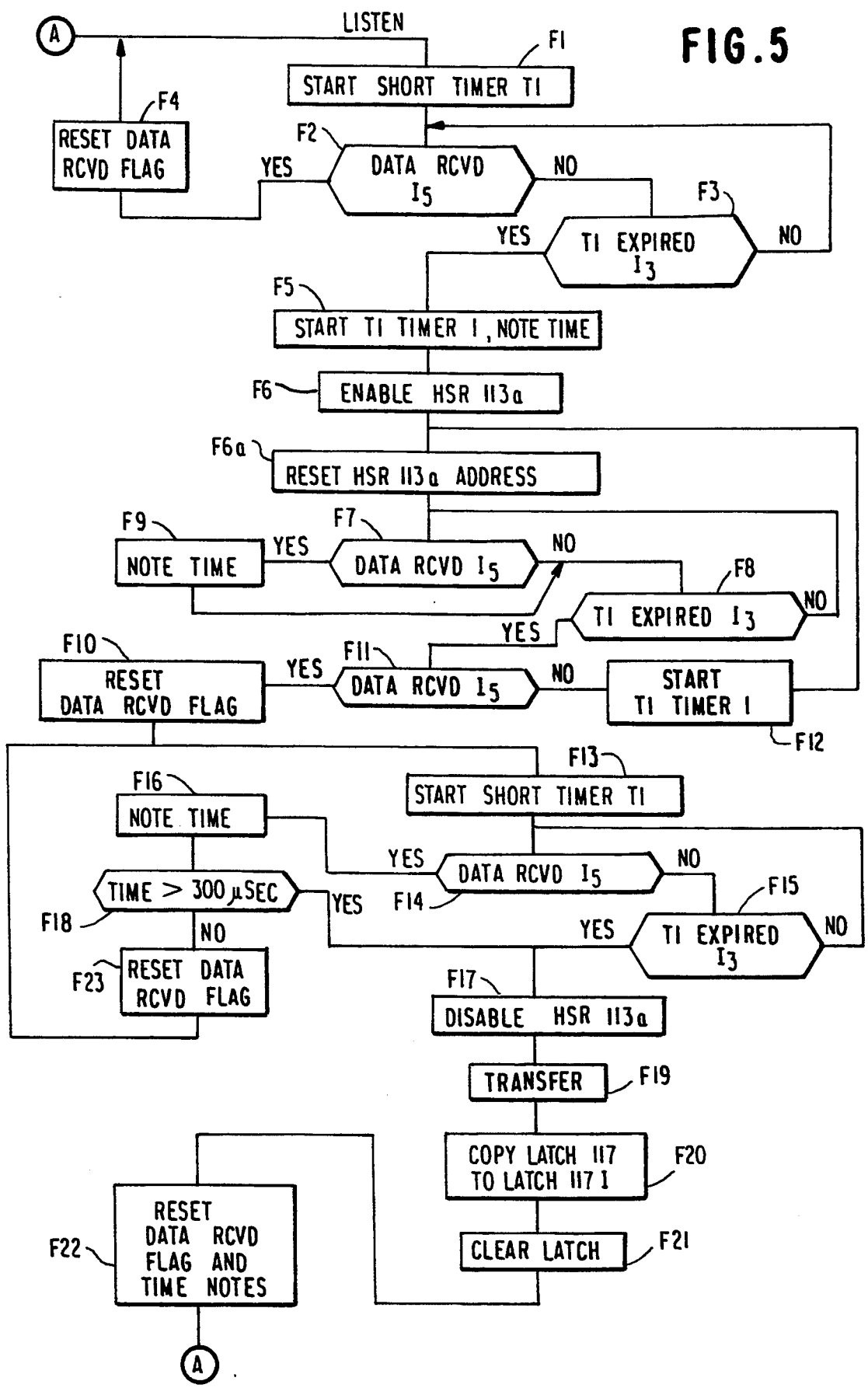
FIG. 5 illustrates the processing which dictates the listen cycle timing including collection and transfer of data.

Referring again to FIG. 3, it is apparent that the data collection phase employs the components REC, ADC 110 and the HSR 113a. FIG. 5 illustrates the manner in which the data collection phase is initiated and terminated, as well as how the data transfer phase is also initiated and terminated.

FIG. 5 shows the listen cycle timing, i.e. the timing which establishes recording of data in the high speed random access memory 113a (which is the data collection phase C) and subsequent to termination of data collection, the transfer of data from the high speed random access memory 113a to the memory 113 (the data transfer phase T). The processing of FIG. 5 is a loop which is continuously performed. The logic has several constraints. Initially, the logic looks for a short time of silence (absence of data). If data collection can begin after a 21 μs period of no data having been detected, then we will be assured of initiating data recording with the beginning of a transponder reply. Preferably, the data collection phase is also terminated with a 21 μs period of silence. However, once data collection has begun, we maintain data collection for at least 100 μs and only then, assuming some data has been collected, is a search made for a 21 μs period of silence. Assuming no data has been collected in the first 100 μs, then that period is re-initiated for if no data is collected there is no point in attempting to transfer any data. However, assuming that data has been collected, then at the expiration of 100 μs a search is begun for a 21 μs period of silence. If such a period is located, then the data collection is terminated and data transfer is initiated. However, if data collection proceeds for 300 μs without locating a 21 μs period of silence, then data collection is terminated and the data transfer phase is executed.

One of the functions which is performed at the beginning of a data transfer phase, is to disable the HSR 113a

(F17). When this is implemented, the data collection phase is effectively terminated. At the termination of the data transfer phase, the data collection phase is again initiated. As shown in FIG. 5, actual data collection is preceded by the functions F1–F3.

Function F1 initiates the timer 1 for the short time. In a preferred embodiment that is about 21 $\mu$s. Function F2 monitors whether or not data has been received. When data is received, a receiver interrupt $I_5$ is provided. The CPU 120 is interrupted and a flag is set indicating the reception of data. Accordingly, function F2 merely checks the status of that flag. If data has been received, then function F4 resets the flag and the timer t1 begins timing a new short time period. On the other hand, if the data receive flag is not set, then the "no" path from function F2 is performed where function F3 checks to see if the timer t1 is expired. Expiration of the timer t1 generates another interrupt ($I_3$) which can be used to set a flag. If the timer t1 has not expired, then processing loops back to function F2 awaiting either reception of data or expiration of the timer t1. On the other hand, if the timer t1 is expired, then that flag is reset (a function not explicitly shown on FIG. 5 but performed each time expiration of the timer t1 is noted) and function F5 is performed. Function F5 starts the timer 1 to now time out the T1 period. At the same time, the time at which timer t1 begins its operation is noted (the purpose for this will become clear hereinafter). Thereafter function F6 is performed to enable the high speed random access memory 113 to begin recording data. Note at this point that data received following execution of F12 is stored at the beginning of the HSR 113a since the address mechanism is reset by Function 6a. Functions F7 and F8 are similar to functions F2 and F3, i.e. they detect whether data is received and whether the timer t1 is expired. If data is detected as having been received, then function F9 notes the time at which data was received. The processing of functions F7 and F8 continues until the timer t1 is expired. Thereafter, function F11 determines if data has been received during the T1 period. If no data has been received, i.e. the data receive flag was not set, then function F12 is performed. Function F12 is similar to function F5 in that the timer t1 is set to the T1 period. Note at this point that data is stored at the beginning of the HSR 113a since the address mechanism is reset by Function 6a.

On the other hand, if data had been received within the T1 period, then function F10 is performed to reset the data receive flag and function F13 is performed to start the timer 1 with another short time. When function F13 is reached, processing has successfully initiated data collection, and data has actually been received and processing now searches for a 21 $\mu$s quiet interval. This is implemented with functions F14 and F15. The successful traverse of this path is the "No" path from function F14 and the "Yes" path from function F15. In other words, no data is received within the short time and that short time has expired. Under these circumstances, the high speed random access memory 113a is disabled by function F17. Function F19 transfers data from the high speed random access memory 113a to the memory 113. Function F20 copies the image of the latch 117 to the memory as latch 117I. Function 121 clears the latch 117 so it will be in condition to detect future receiver condition.

On the other hand, if the successful path is not achieved, i.e. data is received, then function F16 notes the time of that reception and function F18 is performed to determine whether or not the time since initiation of data collection is greater than 300 $\mu$s. If it is, then the data collection phase will be terminated even though a 21 $\mu$s period of silence has not been detected. Under those circumstances then, functions F17–F20 are performed just as they were performed on the successful completion of data collection as previously described.

On the other hand, if function F18 determines that less than 300 $\mu$s has elapsed since the beginning of data collection, then function F23 is performed to reset the data receive flag and processing returns to function F13 to again search for a 21 $\mu$s quiet interval.

At the completion of the data transfer, function F22 is performed which resets the data receive flag and the time notes which have been collected in the processing of this traverse of the loop of FIG. 5. Thereafter, processing returns to function F1 and the loop is begun again.

FIG. 3 shows that the data travels from the HSR 113a to the memory 113 under the control of the CPU 120. As a consequence, during data transfer neither data collection nor threat determination display phases can be performed. It should be apparent from the foregoing description that for the most part data collection and data transfer proceed entirely independent of any transponder suppression.

Figure 4B:
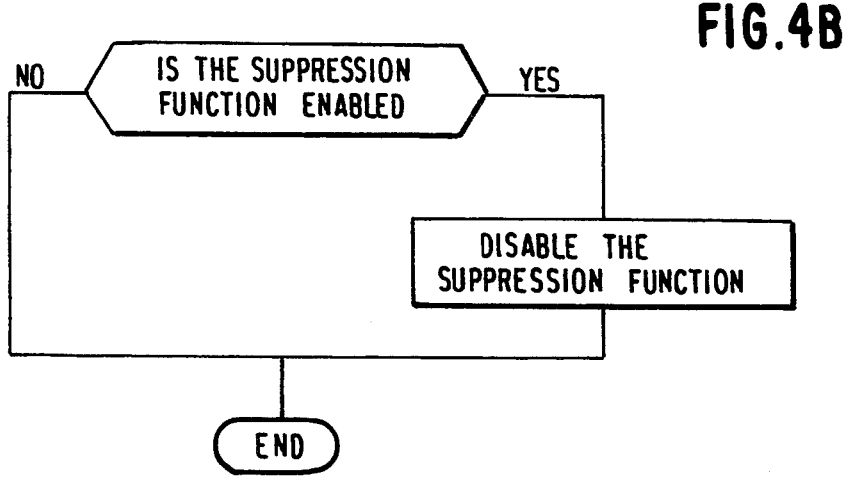
FIG. 4B illustrates logic flow following an indication of expiration of timer $P_1$.
Figure 4A:
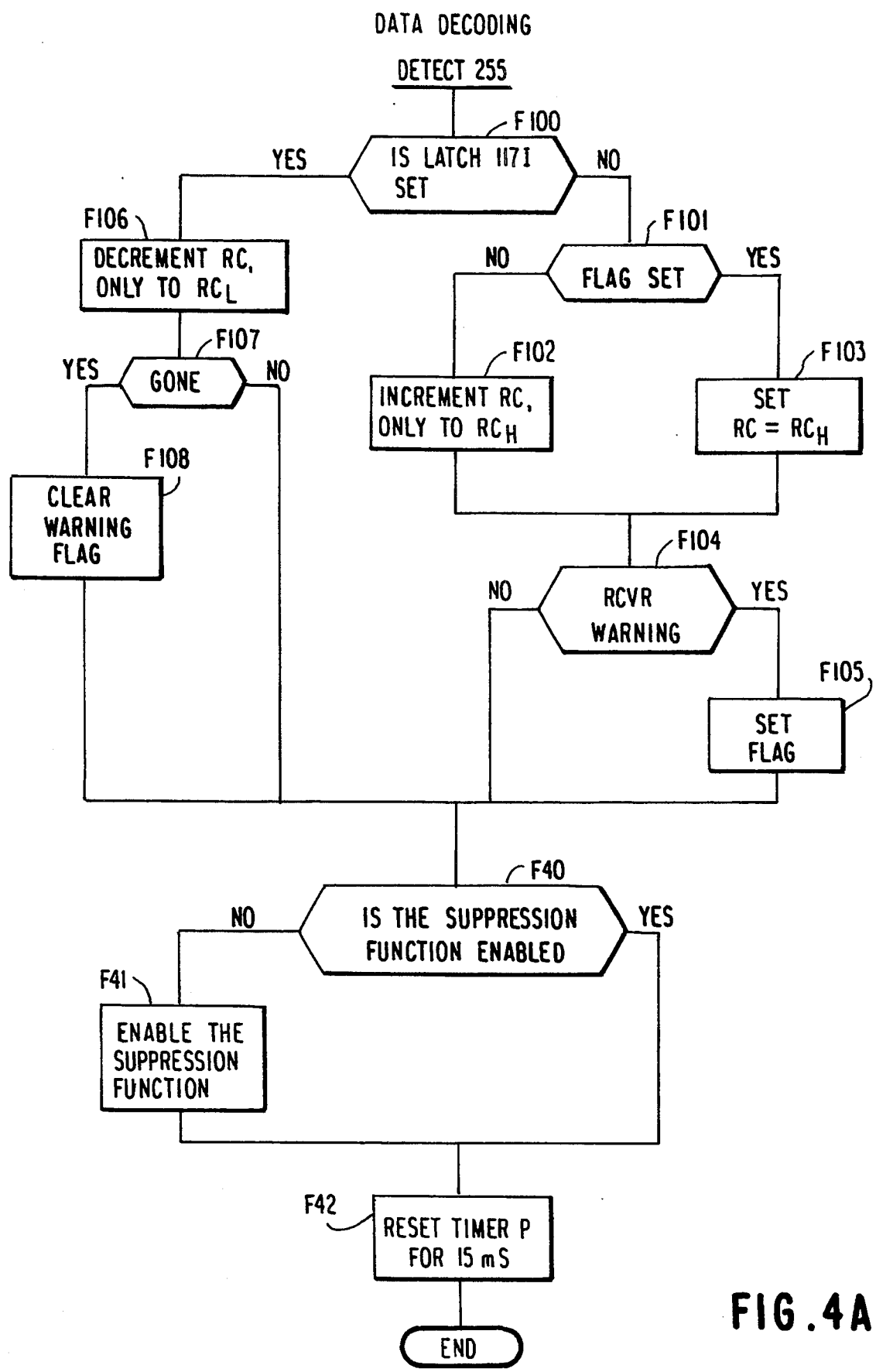
FIG. 4A illustrates logic flow following detection, during the threat determination processing, of the data word 255.
Figure 4C:
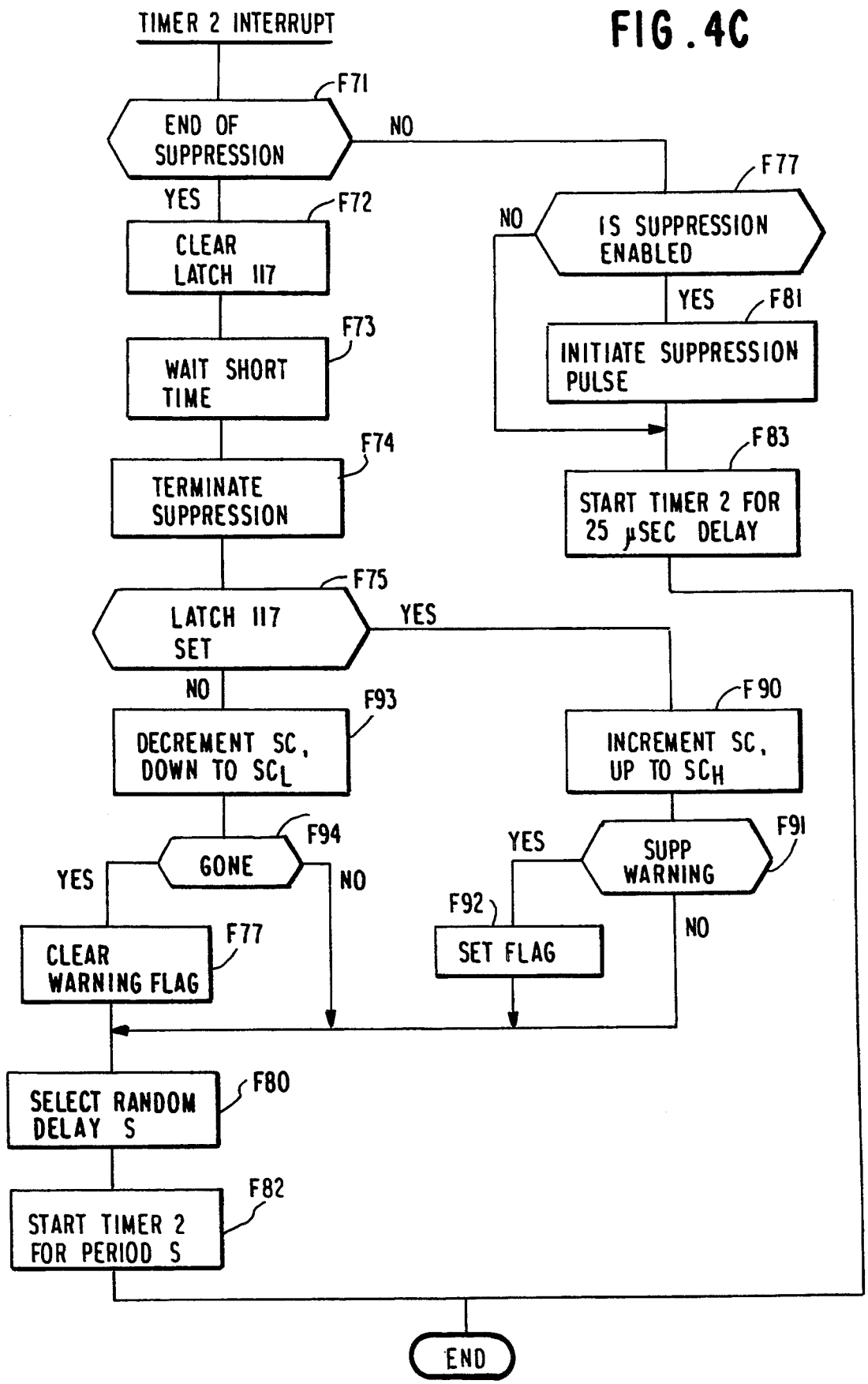
FIG. 4C illustrates processing to create the suppression pulse at appropriate times and check effectiveness of suppression.
Figure 6A:
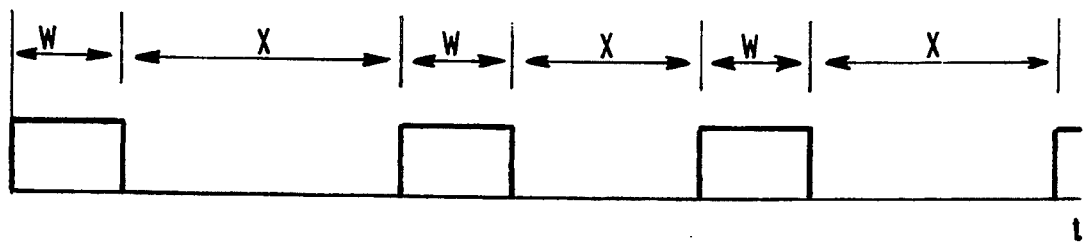
FIG. 6A is a timing diagram showing the timing of a typical suppression pulse train.

As is described in the co-pending application, suppression is important so as to allow the host to detect the presence of other aircraft lying in the vicinity of a line connecting the SSR site to the host. Because other aircraft in the vicinity of this line will be interrogated at about the same time as the host is interrogated, the host's reply will necessarily swamp and render undetectable replies from these other aircraft. In order to prevent this interference, the host transponder is suppressed. Suppression, however, must be limited to ensure that the host itself is visible to the SSR site and to these other aircraft. Experimental evidence indicates that suppression should be brief and randomly initiated. In accordance with a preferred embodiment of the invention, suppression is implemented in a discontinuous fashion by a sequence of suppression pulses, each suppression pulse extending for a duration on the order of 35 $\mu$s, and in a preferred embodiment, approximately 35 $\mu$s. The 35 $\mu$s suppression pulse is a departure from what is described in the co-pending application. That application describes a suppression pulse of approximately 750 $\mu$s. This significantly shorter suppression pulse is one technique which is used to reduce the suppression time. Because data collection proceeds substantially independent of suppression, the very much shorter suppression pulse does not compromise data collection. The randomness is implemented by selecting the delay between the termination of one suppression pulse and the initiation of the next suppression pulse, as a random delay selected in the range of 189 $\mu$s to 861 $\mu$s, so that the random delay has an average (mean) duration of approximately 525 $\mu$s. These parameters are illustrated in FIG. 6A. The manner in which this is implemented is described in connection with FIGS. 4A–4C. The logic of FIGS. 4A–4C is implemented by the CPU 120 in cooperation with timing performed by the timer 2 108. Because interrupts from the timer 2 108 are of a lower priority than interrupts from the timer 1 107, the suppression cycle timing (of FIGS. 4A–4C) is subservient to the listen cycle timing (of FIG. 5). In other words, the processing of an interrupt from timer 2

108 will itself be interrupted in the event that an interrupt from timer 1 107 is detected.

The timing logic, see FIG. 4A, is initiated when the CPU 120 detects a host reply by reading a data word of value 255 from the memory 113. As has been explained, when a host reply is detected, the data encoder 115 writes the digital word 255 to the HSR 113a. Subsequent to termination of a data collection phase C, as has been explained, the data from the HSR 113a is transferred to the memory 113. During a later threat determination and display phase D, the CPU will read the data in memory 113. When the data word 255 is read, it is recognized by the CPU 120 as an indication of a host reply. Consequently, the processing of FIG. 4A is initiated. The functions F 100–108 are initiated by detection of the data word 255 but these functions are related to performance monitoring. Therefore the effect of these functions are not described immediately below but rather this explanation is postponed until a discussion of performance monitoring. Function F40 determines if the suppression function is enabled. The suppression function is merely a flag which is set and reset under the appropriate circumstances. Accordingly, function F40 merely checks the status of this flag. If the suppression function is not enabled (the logic takes the "No" path from function F40), then function F41 is performed to enable the suppression function, i.e. to set the flag. Subsequent to execution of function F41, or in the event function F41 is not performed, function F42 uses the timer P to time a 15 ms period.

Figure 6B:
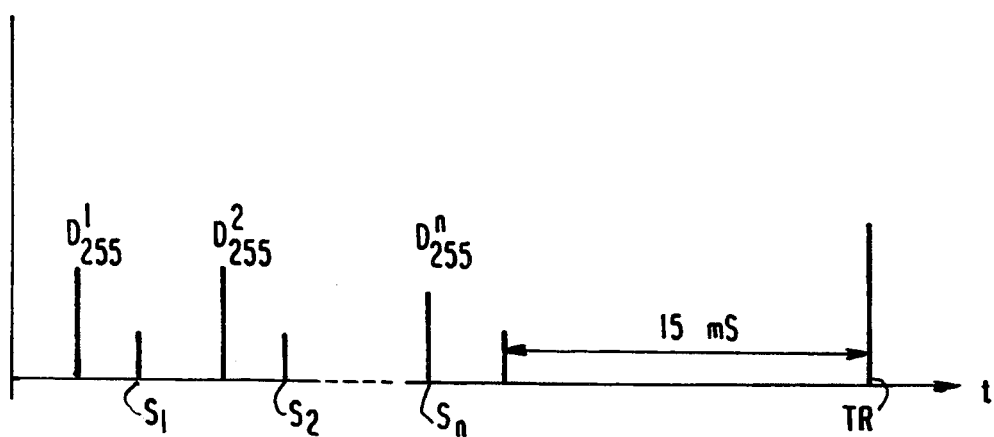
FIG. 6B illustrates operation of the timer P.

While the timer P will indicate expiration of a 15 ms period, in typical practice as the interrogation beam sweeps past the host aircraft it will generate a sequence of replies from the host. Each of these replies, when detected, will result in creation of the data word 255 and as a result the processing shown in FIG. 4A will typically be repeated several times before the timer P notes expiration of a 15 ms period. Nevertheless, after the last reply by the host transponder in any particular sweep, the timer P will mark expiration of 15 ms beyond that time. This action is illustrated in FIG. 6B. FIG. 6B plots several events as a function of time along the axis labeled t. Each of the events labeled $D_{255}$ represents the CPU 120 detecting the digital value 255 in the memory 130. As explained, each such detection initiates the processing shown in FIG. 4A. Each iteration of this logic results in setting the timer P for the 15 ms duration. Each such time the timer P is set is represented in FIG. 6B as event $S_1$ or event $S_2$, etc. As indicated in FIG. 6B, the delay between sequential $D_{255}$ events are such that the timer P does not expire until the last of a series of such events. As illustrated in FIG. 6B, although the timer P is set on several occasions, on only the last occasion of the series does the timer expire and produce the TR (timer expiration) event. When the timer P does indicate expiration of 15 ms from a transponder reply, the processing of FIG. 4B is executed. More particularly, function F43 checks the flag to see if the suppression function is enabled. If it is, function F44 is performed to disable the suppression function, i.e. to reset the flag. Thereafter, the processing shown in FIG. 4B terminates. On the other hand, if the suppression function had not been enabled, then the processing is terminated following the "No" path from function F43.

FIG. 4C illustrates the logic which is run to create the sequence of suppression pulses. The loop shown in FIG. 4C continually operates; when the suppression function is enabled it will result in the production of an appropriately timed suppression pulse. If the suppression function is not enabled, successive iterations of the loop will not generate any suppression pulses.

Beginning at the top of FIG. 4C, when timer 2 expires, an interrupt occurs. The interrupt generated by the timer 2 initiates the processing of FIG. 4C. If the interrupt comes at the end of a suppression cycle (F71), then function F72 clears the latch 117 (see FIG. 2). The latch 117 is set when a host transponder response is properly detected. If it is set simultaneous with the assertion of suppression, then a suppression warning indication is received, the purpose of which will be explained below. In any event, after a short wait (F73, generated by software command executions), suppression is terminated, F74.

Functions F 75, 77, and 90–94 are also related to performance monitoring. Therefore the effect of these functions are not described immediately below but rather this explanation is postponed until a discussion of performance monitoring.

Function F80 is the next step, where the processing selects a random delay S. The random delay S lies between the values of 189 and 861 $\mu s$, with a mean value of 525 $\mu s$. Any conventional technique can be used to perform this random selection; one appropriate technique is described in the parent application. Once having selected the random delay, in function F80, function F82 starts the timer 2 for the selected duration S. The processing then terminates, and begins again when timer 2 expires and the resulting interrupt is generated. If function F71 branches to a "no", then function F79 is performed to check to see if the suppression function is enabled. As has been explained, this can be determined by referring to the appropriate flag. If the suppression function is enabled, then function F81 is performed which creates the rising edge of the suppression pulse and maintains the suppression pulse at an appropriate value. If the suppression function is not enabled, function F81 is not performed so the suppression pulse is not created. In any event, function F83 is performed to start the timer 2 for the initial portion of the suppression duration. In a preferred embodiment, that suppression duration is approximately 35 $\mu s$. Thus, function F83 initiates timer 2 for about 25 $\mu s$ (in order to assure that no reply generated before the suppression was initiated will cause a warning).

The processing then terminates, and begins again when timer 2 expires and an interrupt is generated. It should be clear that in the event the suppression function is enabled but a suppression pulse has not been initiated, then F 81 initiates the suppression pulse and F 83 sets the timer for the major portion of the pulse. When the timer expires and the logic of FIG. 4c is again entered, F 73 provides the remaining delay of the pulse which is then terminated by F 74. Thereafter the delay between the now terminated pulse and the next is selected by F 80 and the timer is initiated by F 82. The next timer 2 interrupt will signal expiration of the selected delay so that execution of F 81 is in order assuming that the suppression function is still enabled at that time.

Performance Monitoring

The invention includes two performance monitoring features, both of which are available only because the processor receives a signal indicating a concurrent host reply. The physical generation of that signal will be described below in connection with FIGS. 7 and 8; it suffices for the present to note that the line 128 carries the signal XPNDR IN into the comparator 129. In the event that the amplitude of XPNDR IN is at or above the threshold, the comparator 129 produces the signal XPNDR DET which is input to the data encoder 115 on the one hand and the AND gate 116 on the other hand. The effect of XPNDR DET at the data encoder has already been described. The other input to the AND gate 116 is the MSB (Most Significant Bit) output of the A/D converter 110. Accordingly, if the output of th A/D converter corresponds to a received amplitude which is at least 50% of the maximum output, MSB will be asserted, the AND 116 will be satisfied and the latch 117 will be set. The specification has also described that, as part of the data transfer phase, when data from the HSR 113a is transferred to the memory 113, another bit of data, the status of the latch 117, is also transferred to the memory and referred to as latch 117I.

The two bases for performance monitoring will now be described. Inasmuch as the host transponder is located immediately adjacent the TCAD receiver (they are both supported by the same host aircraft), the receiver output caused by a host transponder reply should be relatively large, indeed, it should always exceed 50% of the full scale output of the A/D converter 110. In other words, the MSB should be asserted for every properly received host transponder reply. On each host reply in which the MSB is asserted, the latch 117 will be set and therefore the latch 117I will also reflect the set state of the latch. The presence of XPNDR DET at the data encoder 115 is to generate the data word 255, which is unique to this condition. In other words, no other input to the data encoder 115 can generate the data word 255. The data word is coupled via the system controller 111 to the HSR 113a and eventually transferred from there to the memory 113 where it is monitored by the CPU 120. As will be described below, when the CPU 120 detects the data word 255, it checks to see whether latch 117I is set. The failure to have that latch set when the 255 data word is detected is an indication of a receiver failure.

The other basis for performance monitoring is the fact that the host transponder should not be replying concurrently with the existence of a suppression pulse. That condition is also monitored by the latch 117. More particularly, and as will be described below, during the existence of a suppression pulse, the latch 117 is cleared. Immediately following termination of that suppression pulse, the status of the latch 117 is checked. If the latch is again set, that is an indication that the suppression pulse was not effective. The manner in which that event is treated will also be described below.

The CPU 120 maintains two counters: a Receiver Counter (RC) which is associated with monitoring receiver failures and a Suppression Counter (SC) which is associated with monitoring suppression failures. Each of the counters is associated with limiting values and thus RC is associated with a high value $RC_h$ and a low value $RC_l$. Likewise, SC is associated with a high value, $SC_h$ and a low value $SC_l$. On initialization, the CPU writes $RC_l$ to RC and $SC_l$ to SC.

When the data word 255 is detected, the processing of FIG. 4A is initiated. The effect of functions F40–F42 has already been described. When function F100 is reached, a branch is made on the status of latch 117I. If the latch is set, function F106 decrements the quantity in RC, but not below $RC_l$. Function F107 determines if any receiver warning failure has been vitiated. This function merely requires reference to the contents of RC. If the content is $RC_l$, clearly the effect of any receiver warning failure has been vitiated and therefore it is appropriate to perform function F108. Function F108 may also be performed in the event the quantity in RC is higher than $RC_l$. How close the quantity in RC can approach $RC_h$ and still be appropriate to clear the warning flag 108 depends on the statistics of operation of the latch 117. Typically, it is advisable to make decisions on alerting an operator to a suppression or receiver failure based on data acquired throughout a duration of several minutes, say three minutes. Within this period, there will be a given number of opportunities for the host transponder to reply, if the host is in range of an SSR. Each reply provides an opportunity to test receiver operation. Host transponder replies will also initiate suppression, unless suppression had already been initiated. The suppression condition provides an opportunity to test the effect of suppression.

For example, assume there are 10 counts between $RC_l$ and $RC_h$ and the same 10 counts between $SC_l$ and $SC_h$. Preferably, if RC is within 2 or 3 counts of $RC_l$, it is appropriate to clear the warning flag.

On the other hand, if the latch 117I is not set, then function 101 determines whether the receiver warning flag is presently set. The fact that the latch 117I was not set is an indication of a receiver failure. If the flag is set, function 103 sets the quantity in RC to $RC_h$. On the other hand, if the receiver warning flag is not set, then function 102 increments the quantity in RC, but only up to a maximum of $RC_h$. Thereafter, function F104 determines if the receiver warning flag should be set. This again requires reference to the contents in RC. Clearly, if the contents of RC is $RC_h$, then the receiver warning flag will be set. It may be appropriate to set the receiver warning flag even if the contents of RC is several counts below $RC_h$. Exactly what threshold is to be used to set the receiver warning flag depends on the statistics of operation of the latch 117. For example, if there are 10 counts between $RC_h$ and $RC_l$ and if the contents of RC is within 2 or 3 counts of $RC_h$, the receiver warning flag should be set. That determination results in executing function F105 to set the receiver warning flag.

The foregoing processing demonstrates that the counter RC maintains a running history of the most recent pertinent events to receiver warning. If the receiver warning indication has been provided sufficiently often, in the absence of proper receiver functioning, then the receiver warning flag will be set. Typically, when the warning flag is set, an audible or visible indication is given to the pilot. This indication will be maintained so long as the flag is set.

The other element of performance monitoring is the monitoring of suppression operation, i.e. has the host transponder replied during the occurrence of a suppression pulse? The processing appropriate to this function is shown in FIG. 4C, more particularly, the functions F75, F77 and F90–F94. Whereas the processing shown in FIG. 4A operated on an image of the latch which was captured at the time of data transfer, the processing of FIG. 4C focuses on the state of latch 117 itself. The processing of FIG. 4C is initiated on each timer 2 interrupt. The logic flow can either follow the path F76, F81, F83, which may initiate the beginning of a suppression pulse, or the other path beginning at F72 for the purpose of terminating a suppression pulse. When the first path is followed, function F83 is performed which starts the timer 2 for a 25 μs delay. This is the major portion of a suppression pulse. When that delay has expired, the processing of FIG. 4C is again initiated, but this time the path headed by function F72 is followed. In other words, the logic beginning with function F72 is initiated during the existence of a suppression pulse. Function F72 clears the latch 117. Function F73 delays for the remaining portion of the suppression pulse, on the order of 10 μs. Function F74 then terminates the suppression pulse. Immediately following function F74, function F75 is performed to determine whether the latch 117 is set. Since the latch had been cleared at function F72, it could only be detected as being set (at F75) if it was set during the suppression pulse. Thus, if function F75 determines that the latch is set, that is an indication of a suppression failure. Consequently, function F90 increments SC (but only up to a maximum of $SC_h$). Function F91 determines whether a suppression warning is appropriate. Executing function F91 only requires a comparison of the contents of SC to the appropriate threshold, say several counts below $SC_h$. If it is appropriate to provide the warning, then function F92 sets the suppression warning flag. Otherwise, function F92 is not performed.

On the other hand, if F75 determines that the latch is not set, then function F93 decrements the contents of SC (but only down to $SC_l$). Function F94 then determines whether the suppression warning can be cleared. Clearly, if SC has been decremented to $SC_l$, that processing is appropriate. Depending on the number of counts between $SC_l$ and $SC_h$, it may also be appropriate to clear the suppression warning flag if the contents of SC is within 2 or 3 counts of $SC_l$. If clearing the flag is appropriate, then function F77 clears the warning flag. Like the receiver warning flag described above, when set the suppression warning flag is reflected in a visible or audible indication to the pilot. The indication is maintained so long as the flag is set.

Referring again to FIG. 1, as has been explained the path 128 between the transponder 52 and the receiver/processor 102 allows monitoring several different components of the aircraft carried equipment. This allows, for example, monitoring of the effectiveness of the suppression pulse and it also allows monitoring the proper operation of the receiver component REC of the receiver/processor 102.

Figure 7:
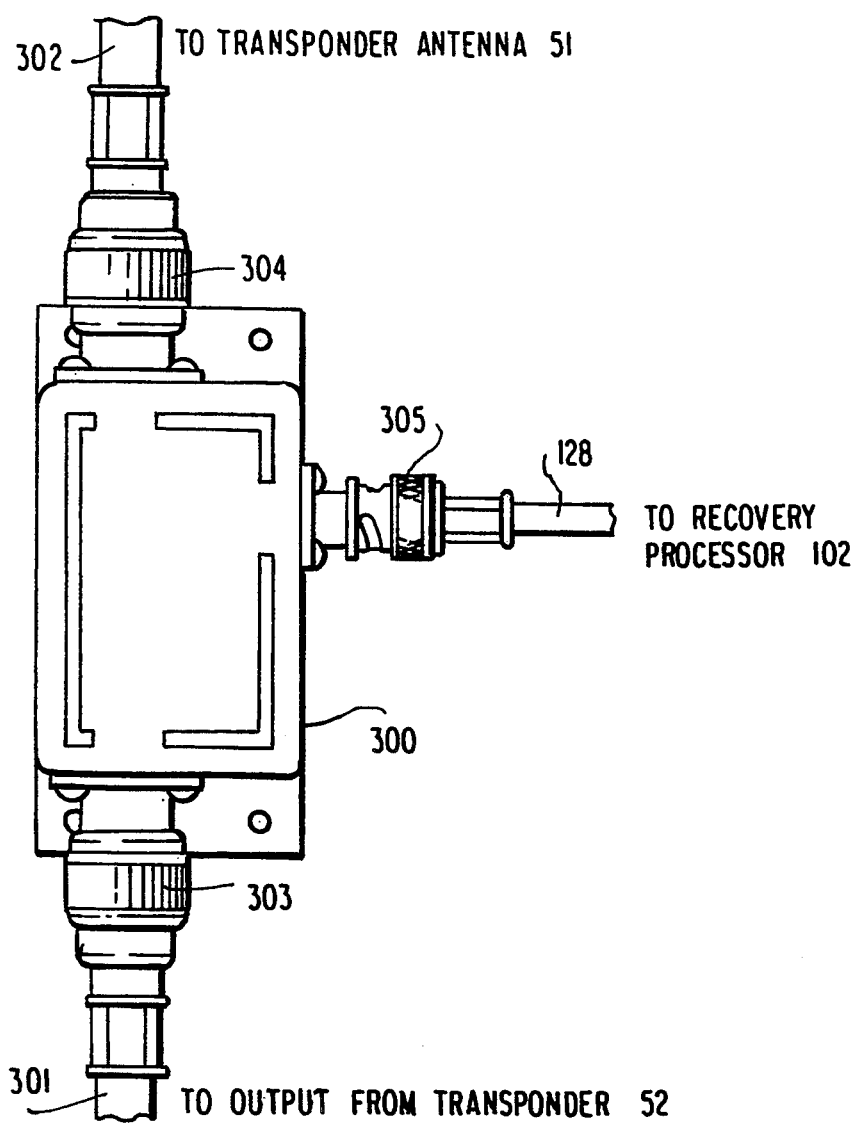
FIG. 7 illustrates the connection between the transponder 52, its antenna 51 and the path 128 in more detail, illustrating specifically the coupler 300.

Whereas FIG. 1 shows that the path 128 carries a signal derived from the transponder output to its antenna 51, FIG. 7 shows the manner in which the path 128 is actually connected. More particularly, as illustrated in FIG. 7, the conductor carrying the output of the transponder 52 is shown in FIG. 7 as the conductor 301. This conductor has a connector 303 to provide an electrical connection from the conductor 301 to the "XPDR" input of an XPDR coupler 300. The XPDR coupler 300 has a terminal labeled "ANT" to which a connector 304 is connected. The connector 304 provides the connection from the XPDR coupler 300 (particularly its ANT terminal) to a conductor 302 which in turn is connected to the antenna 51. The XPDR coupler 300 has a further terminal, labeled "TCAD". This terminal has a further connector 304 coupled thereto providing for electrically connecting the path 128 to the TCAD terminal of the XPDR coupler 300. In a preferred embodiment, the connectors 303, 304 are N-type connectors, whereas the connector 305 is a BNC type RG-58A/U triaxial cable.

Figure 8:
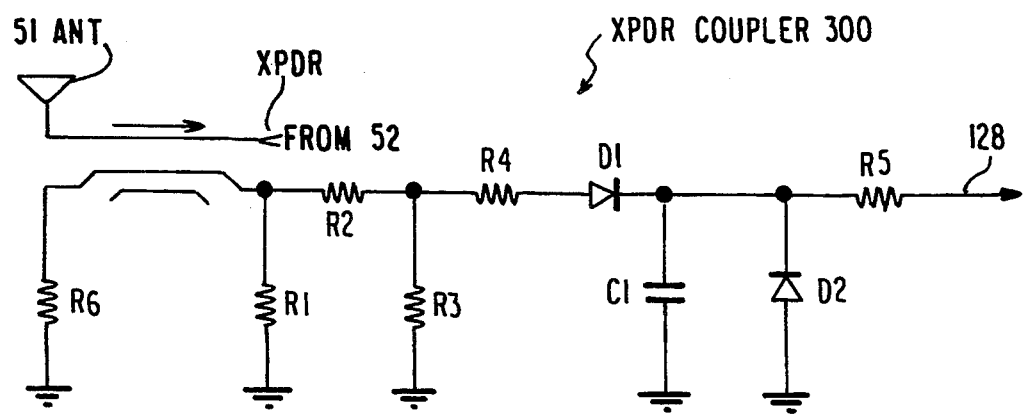
FIG. 8 is a schematic of the components internal to the coupler 300.

FIG. 8 illustrates the electrical components internal to the XPDR coupler 300. As shown in FIG. 8, connected between the terminals XPDR and ANT is a directional coupler. One portion of the directional coupler is a heavy track on a circuit board. A second portion of the directional coupler is a smaller track which is in close proximity to the heavy track. RF energy traversing the directional coupler from the XPDR to the ANT terminals generates a current in the smaller track. A diode circuit generates a voltage from this current. In the preferred embodiment, the signal at the coupler output labeled "TCAD" is −30 db from the transponder signal and thus provides a signal of >140 millivolts. Comparator 129 (see FIG. 2) in the TCAD receiver/processor 102 receives this as an input. When the input reaches 140 millivolts, the comparator 129 outputs a 5 volt signal XPNDR DET, otherwise the comparator output is null. As a consequence, the comparator output XPNDR DET is a square wave of approximately 5 volt magnitude that corresponds to the RF output from the transponder on a pulse-for-pulse basis. The output XPNDR DET of comparator 129 is the input to the data encoder 115 and AND gate 116 shown in FIG. 2.

Although a preferred embodiment has been described in detail, it should be apparent that many changes can be made within the spirit and scope of the present invention. For example, part of the listen cycle timing (FIG. 5) is dictated by the necessity to transfer data from the HSR 113a to the memory 113. This operation, however, may be eliminated by using dual memories in a ping-pong arrangement, or adding an additional processor, or both. In addition, as described herein, the simultaneous presence of a suppression pulse and a host reply is detected by directing the CPU to check the latch after a suppression pulse has been created and before it has been terminated. However, an additional latch could be set by an additional AND gate so that some CPU time could be saved by merely having the CPU check and reset the latch. Furthermore, the description shows an electrical connection between the transponder 52 and the processor. Those skilled in the art will recognize that there are alternatives to using an electrical connection which include an optical connection and/or an RF link which can discriminate against replies from transponders other than the host. Accordingly, these and other changes fall within the spirit and scope of the present invention which is to be construed in accordance with the claims attached hereto and not limited by the specific example described herein.

We claim:

1. Apparatus for proximity alerting an operator of a transponder equipped host aircraft to the presence of other aircraft based on receipt of replies of aircraft carried transponders to interrogation by an SSR comprising:
   a) a receiver tuned to receive transponder replies;
   b) a processor coupled to said receiver for decoding received replies and processing information extracted therefrom for operator alerting;
   c) means coupling a signal from said host transponder to said processor to indicate transmission of a reply by said host transponder; and
   d) means in said processor responsive to said signal for initiating generation of a suppression signal pulse train.

2. Apparatus as recited in claim 1 further including:
   e) timer means in said processor responsive to said signal for timing a predetermined period following said signal; and f) means included in said processor and responsive to expiration of said predetermined period for terminating generation of said suppression signal pulse train.

3. Apparatus as recited in claim 2 wherein said means responsive to expiration of said predetermined period resets said timer means on each said signal whereby said timer means expires only after expiration of said predetermined period in the absence of said signal.

4. Apparatus as recited in claim 1 wherein said means for initiating a suppression signal pulse train comprises:
   d1) means for creating a suppression pulse of a predetermined duration;
   d2) means responsive to termination of a suppression pulse for selecting a random delay; and
   d3) means responsive to termination of said random delay for creating a further suppression pulse of said predetermined duration.

5. Apparatus as recited in claim 4 wherein each of suppression pulses has a duration of approximately 35 $\mu$s.

6. Apparatus as recited in claim 4 wherein said random delay is selected as lying in a range of about 190 $\mu$s to about 860 $\mu$s with a mean duration of about 525 $\mu$s.

7. A method of passively collecting, in a transponder equipped host aircraft, information on proximity of other aircraft based on receipt of transponder replies from other aircraft comprising the steps of:
   a) providing a receiver responsive to transmissions of aircraft transponders;
   b) providing a processor coupled to said receiver for decoding and processing replies received by said receiver from aircraft transponders;
   c) coupling an output from said host transponder to said processor; and
   d) initiating suppression of said transponder in response to detection, by said processor of the output from said host transponder coupled to said processor.

8. A method as recited in claim 7 including the further step of:
   e) initiating a timer, for timing out a predetermined period, on detection of said output from said host transponder, resetting said timer on detection of the output from said host transponder during a timing operation of said timer; and
   f) terminating suppression to said transponder in the event said timer completes timing out said predetermined period.

9. A method as recited in claim 7 wherein said step of initiating suppression of said transponder includes the further steps of:
   d1) creating a suppression pulse of a predetermined duration;
   d2) selecting, in response to termination of a suppression pulse, a random delay; and
   d3) in response to expiration of said selected random delay, creating a further suppression pulse of said predetermined duration.

10. A method as recited in claim 9 wherein said predetermined duration is about 35 $\mu$s.

11. A method as recited in claim 9 said random delay is selected as lying in a range of about 190 $\mu$s to about 860 $\mu$s with a mean duration of about 525 $\mu$s.

12. A method of suppressing a host transponder to enable detection, by a host carried proximity warning device of other aircraft where said host carried proximity warning device is based on detection of replies by transponders of other aircraft comprising the steps of:
   a) detecting replies from said host transponder;
   b) initiating, in response to detection of a reply by said host transponder, alternating periods of listening/suppression and periods of listening/no suppression by timed suppression of said host transponder; and
   c) terminating said alternating periods by terminating said timed suppression to said host transponder in the absence of a reply from said host carried transponder for a predetermined period.

13. A method as recited in claim 12 wherein said step a) comprises:
   a1) providing a host borne receiver tuned to transponder transmissions;
   a2) providing a host borne processor responsive to outputs of said host borne receiver; and
   a3) providing an electrical connection between said host borne processor and said host transponder to enable said host borne processor to differentiate replies transmitted by said host transponder from replies transmitted by other transponders.

14. A method as recited in claim 12 wherein said step of initiating alternating periods of listening/suppression with periods of listening/no suppression comprises:
   b1) in response to detection of a host transponder reply, initiating a suppression sequence including suppression pulses of a predetermined duration separated by random delays selected within a given range of delays; and
   b2) maintaining a listen cycle for the collection of data and transfer of collected data substantially independent of the suppression sequence.

15. A method as recited in claim 14 wherein said predetermined duration is about 35 $\mu$s and said random delay lies within a range of about 190 $\mu$s to about 860 $\mu$s with a mean of about 525 $\mu$s.

16. Apparatus for proximity alerting an operator of a transponder equipped host aircraft to the presence of other aircraft based on receipt of replies of aircraft carried transponders to interrogation by an SSR comprising:
   a) a receiver tuned to receive transponder replies for generating receiver data representing transponder replies;
   b) a processor responsive to said receiver data for storing said receiver data, for decoding received replies and processing information extracted therefrom for operator alerting;
   c) means coupling a signal from said host transponder to said processor to indicate transmission of a reply by said host transponder; and
   d) means responsive to said signal and to concurrent receiver data for uniquely encoding said concurrent receiver data to represent a host transponder reply.

17. Apparatus as recited in claim 16 which further includes:
   e) threshold means responsive to said receiver data for indicating whether said receiver data indicates an amplitude below a predetermined threshold; and
   f) alarm means jointly responsive to said signal and to an indication from said threshold means indicating an amplitude below said predetermined threshold for indicating a receiver failure.

18. Apparatus as recited in claim 17 wherein said threshold means comprises an analog to digital converter with a particular output and wherein said alarm means includes a gate responsive to said signal and to said particular output for clearing a latch in the presence of said signal and in the absence of an output from said particular output of said analog to digital converter.

19. A method of proximity alerting an operator of a transponder equipped host aircraft to the presence of other aircraft based on receipt of replies of aircraft carried transponders to interrogations by an SSR, said method comprising:
   a) generating data from said receiver representing transponder replies received by said receiver;
   b) storing said data for processing to identify aircraft proximate to said host aircraft;
   c) generating a signal, simultaneous with a host transponder reply;
   d) uniquely encoding data from said receiver in the presence of said signal; and
   e) storing said uniquely encoded data to discriminate host transponder replies from other replies.

20. A method as recited in claim 19 comprising the further steps of:
   f) generating a suppression pulse for suppression of said host transponder; and
   g) providing a distinctive indication on receipt of said signal during a duration of said suppression pulse.

21. A method as recited in claim 19 comprising the further steps of:
   f) comparing amplitude of data from said receiver concurrent with said signal to a predetermined threshold; and
   g) indicating a receiver failure if said amplitude of receiver data concurrent with said signal is less than a predetermined threshold.

22. In an apparatus for alerting an operator of a transponder equipped host aircraft to the presence of other aircraft based on receipt of replies of aircraft carried transponders to interrogation by an SSR, a performance monitor for monitoring operation of the alerting apparatus, the alerting apparatus comprising a receiver tuned to receive replies transmitted by aircraft transponders and a processor responsive to said receiver, said performance monitor comprising:
   a) means coupling a signal indicating transmission of a reply by said host transponder from said host transponder to said processor;
   b) means for indicating amplitude of a reply from said receiver;
   c) means for comparing said indicated amplitude of a reply, concurrent with said signal, to a threshold; and
   d) means responsive to said indicated amplitude less than said threshold for indicating a receiver failure.

23. An apparatus for alerting an operator of a transponder equipped host aircraft to the presence of other aircraft based on receipt of replies of aircraft carried transponders to interrogation by an SSR, said apparatus comprising:
   a) a receiver tuned to receive replies transmitted by aircraft transponders;
   b) a processor responsive to said receiver; and
   c) a performance monitor comprising:
      c1) means coupling a signal from said host transponder indicating transmission of a reply by said host transponder, to said processor;
      c2) means for indicating amplitude of a reply from said receiver;
      c3) means for comparing said indicated amplitude, concurrent with said signal, to a threshold; and
      c4) means responsive to said indicated amplitude less than said threshold for indicating a receiver failure.

24. Apparatus as recited in claim 23 wherein said means for indicating a receiver failure comprises:
   c41) a counter;
   c42) first means for changing the contents of the counter in one sense in response to indications of amplitude less than said threshold;
   c43) second means for changing the contents of the counter in an opposite sense in response to indications of amplitude greater than said threshold; and
   c44) means responsive to a counter in said counter having a predetermined relation to a specified count for alerting an operator to a receiver failure.

25. Apparatus as recited in claim 24 which further includes means responsive to a count in the counter which does not have the predetermined relation to the specified count for cancelling any alert of receiver failure.

26. Apparatus as recited in claim 24 wherein said first means increments the counter, but only up to a first predetermined count and wherein said second means decrements the counter, but only down to a second predetermined count.

27. In an apparatus for alerting an operator of a transponder equipped host aircraft to the presence of other aircraft based on receipt of replies of aircraft carried transponders to interrogation by an SSR, a performance monitor for monitoring operation of the alerting apparatus, the alerting apparatus comprising a receiver tuned to receive replies transmitted by aircraft transponders, a processor responsive to said receiver including a suppression generator for generating a signal to suppress transmissions from said host transponder and an electrical connection between said host transponder and said processor for a signal indicating transmission of a reply from said host transponder, said performance monitor comprising:
   a) monitoring means initiated into operation during suppression of said host transponder for monitoring for the presence of said signal from said host transponder indicating transmission of a reply by the host transponder; and
   b) means responsive to said monitoring means for indicating a suppression failure in the event said monitoring means detects the presence of said signal from said host transponder indicating transmission of a reply by the host transponder.

28. Apparatus as recited in claim 27 wherein said means for indicating a suppression failure comprises:
   d21) a counter;
   d22) first means for changing the contents of the counter in one sense in response to detection of the signal from the host transponder;
   d23) second means for changing the contents of the counter in an opposite sense in response to failure to detect the signal from the host transponder; and
   d24) means responsive to a count in said counter having a predetermined relation to a specified count for alerting an operator to a suppression failure.

29. Apparatus as recited in claim 28 which further includes means responsive to a count in the counter which does not have the predetermined relation to the specified count for cancelling any alert of suppression failure.

30. Apparatus as recited in claim 29 wherein said first means increments the counter, but only up to a first predetermined count and wherein said second means decrements the counter, but only down to a second predetermined count.

31. An apparatus for alerting an operator of a transponder equipped host aircraft to the presence of other aircraft based on receipt of replies of aircraft carried transponders to interrogation by an SSR;
   a) a receiver tuned to receive replies transmitted by aircraft transponders;
   b) a processor responsive to said receiver including a suppression generator for generating a signal to suppress transmissions from said host transponder;
   c) an electrical connection between said host transponder and said processor for a signal from said host transponder indicating transmission of a reply from said host transponder;
   d) a performance monitor comprising:
      d1) monitoring means initiated into operation during suppression of said host transponder for monitoring for the presence of said signal from said host transponder indicating transmission of a reply by the host transponder; and
      d2) alarm means responsive to said monitoring means for indicating an interface failure in the event said monitoring means detects the presence of said signal from said host transponder indicating transmission of a reply by the host transponder.

32. A method of monitoring operation of an apparatus for alerting an operator of a host aircraft, with its own host transponder, to proximity of other aircraft based on detection of replies, transmitted by aircraft carried transponders, to interrogations by an SSR, comprising the steps of:
   a) receiving and digitizing replies from transponders to SSR interrogations;
   b) indicating those of the replies which originated from the host transponder;
   c) comparing a digitized reply which is indicated as originated from the host transponder to a threshold; and
   d) indicating a receiver failure in the event the digitized reply operated on in step (c) is found to be less than said threshold.

33. A method of monitoring operation of an apparatus for alerting an operator of a host aircraft, with its own host transponder, to the proximity of other aircraft based on detection of replies, transmitted by aircraft carried transponders, to interrogation by an SSR, comprising the steps of:
   a) receiving and recording replies from transponders to SSR interrogations, said recording including recording an indication of the amplitude of the reply;
   b) detecting replies which originated from the host transponder;
   c) selectively suppressing the host transponder;
   d) detecting the simultaneous occurrence of transponder suppression and receipt of a transponder reply from the host transponder; and
   e) indicating a suppression failure in the event the detecting step d) indicates the simultaneous occurrence of transponder suppression and receipt of a transponder reply from the host transponder.

34. Apparatus for proximity alerting an operator of a transponder equipped host aircraft to the presence of other aircraft based on receipt of replies of aircraft carried transponders to interrogation by an SSR, where a transponder reply has a duration no less than a predetermined period, said apparatus comprising:
   a) a receiver tuned to receive transponder replies;
   b) processor means coupled to said receiver for decoding received replies and processing information extracted therefrom for operator alerting;
   c) said processor means including:
      c1) an analog to digital converter responsive to an output of said receiver;
      c2) a memory selectively responsive to an output of said analog to digital converter;
      c3) detecting means responsive to an output of said analog to digital converter for detecting a predetermined period containing no significant output from said receiver;
      c4) enabling means responsive to said detecting means for thereafter enabling said high speed memory to respond to said output of said analog to digital converter by recording said output;
   whereby operation is improved by preventing memory response to trailing portions of transponder replies.

35. Apparatus as recited in claim 34 wherein said processor means further comprises:
   c5) timing means initiated into operation by said detecting means for timing a first period;
   c6) data detecting means responsive to said output of said analog to digital converter for detecting the presence or absence of significant output during operation of said timing means; and
   c7) control means responsive to said data detecting means detecting the absence of significant output during said first period of said timing means for re-initiating said timing means.

36. Apparatus as recited in claim 35 wherein said control means responds to said data detecting means detecting the presence of significant output during said first period of said timing means for initiating a second control means into operation, said processor means further including:
   c8) said second control means for monitoring during time succeeding the first period;
   if said succeeding time contains no significant output from said receiver, said second control means terminates responsiveness of said memory to said analog to digital converter and initiates decoding of data recorded in said memory;
   if said succeeding predetermined period does contain significant output from said receiver then said control means terminates responsiveness of said memory to said analog to digital converter and initiates decoding of data recorded in said memory either on:
      detection of said a further predetermined period with no significant output from said receiver; or
      on expiration of a second fixed period measured from initiation of said first fixed period.

37. Apparatus as recited in claim 36 wherein said predetermined period is on the order of 21 μs, said first period is on the order of 100 μs and the second fixed period is on the order of 300 μs.

38. A method of passively collecting, in a transponder equipped host aircraft, information on proximity of other aircraft based on receipt of transponder replies from other aircraft, wherein the transponder replies extend over at least a predetermined period in time, said method comprising the steps of:
a) providing a receiver responsive to transmissions of aircraft transponders;
b) providing a memory coupled to said receiver for selectively recording data from said receiver;
c) providing a processor coupled to said memory for identifying replies within said recorded data, decoding identified replies and processing decoded replies for identification of proximity information; and
d) inhibiting said memory from responding to receiver output for an initial predetermined period of no significant receiver output whereby said memory operation is improved by preventing recording of trailing portions of transponder replies.

39. A method as recited in claim 38 which includes the further steps of:

e) enabling said memory to record data from said receiver following said predetermined period of no significant receiver output for at least a first fixed period;
f) initiating a timer at the expiration of said first fixed period for detecting either:
a predetermined period of no significant receiver output; or
expiration of a second fixed period measured from initiation of said first fixed period; and
g) terminating responsiveness of said memory to said receiver output and initiating decoding of data recorded in said high speed memory.

40. A method as recited in claim 39 wherein said predetermined period is on the order of 21 $\mu$s, said first fixed period is on the order of 100 $\mu$s and the second fixed period is on the order of 300 $\mu$s.

* * * * *